Patented Jan. 25, 1938

2,106,181

UNITED STATES PATENT OFFICE 2,106,181

ETHYNYL CARBINOLS AND PROCESS OF PREPARING THE SAME

Oscar Robert Kreimeier, Woodstown, N. J., assignor to E. I. du Pont de Nemours & Company, Wilmington, Del., a corporation of Delaware No Drawing. Application July 20, 1936, Serial No. 91,623

10 Claims. (Cl. 260—156)

This invention relates to alcohols prepared from aldehydes and alkali metal acetylides, and to a process for preparing them. More particularly, it relates to a process for preparing primary and secondary alpha-ethynylcarbinols from aldehydes and very soluble and reactive forms of alkali metal acetylides in solution in liquid ammonia.

Several methods for the preparation of ethynylcarbinols have been reported in the literature but all of them are objectionable, chiefly because of poor yields, but also because of difficulty in controlling the reactions, use of inflammable solvents such as ether, or the unsatisfactory solubility of the reactants and products in the reaction media. Of the methods which have been employed, one which has found considerable favor is the reaction of an alkali metal acetylide with aldehydes or ketones, followed by hydrolysis of the product to liberate the free ethynylcarbinol. These reactions have heretofore been conducted either in the absence of a solvent or reaction medium, or in dry ether or liquid ammonia. The procedure employed has been to dissolve or suspend the preformed alkali metal acetylide in the reaction medium, to add the desired carbonyl compound thereto and, after reaction has taken place, to isolate the ethynylcarbinol by conventional means.

The alkali metal acetylides heretofore employed for reaction with aldehydes have been prepared (1) by reacting the alkali metal with acetylene in a suitable relation medium such as liquid ammonia, dry ether or benzene, or (2) by reacting acetylene with an alkali metal amide in liquid ammonia, dry ether or other suitable reaction medium. The first method has not been practiced to any great extent because of undesirable side reactions such as polymerization or hydrogenation of some of the reactants, whereby yields are reduced and the products contaminated. The second method, i. e., the use of alkali metal amides has heretofore been open to three objections, namely: alkali metal amides, being unstable, are inconvenient and expensive to prepare and store; they have not been sufficiently soluble in reaction media such as liquid ammonia; and the particular types of alkali metal amides heretofore used react very slowly and the yields of alkali metal acetylides have consequently not been good.

This invention has as an object the provision of a new process for the preparation of primary and secondary alpha-ethynylcarbinols. A further object is the provision of new ethynylcarbinols. Other objects will appear hereinafter.

These objects are accomplished by the following invention which consists in reacting an alkali metal with an excess of liquid ammonia in the presence of an alkali metal oxide and of an ammonia-soluble hydrated salt of a ferrous metal, reacting the solution of alkali metal amide thus formed with acetylene, and finally reacting the resulting alkali metal acetylide in situ with an aldehyde. All three steps are carried out in liquid ammonia as one continuous process. Sodium is a typical alkali metal, sodium oxide a suitable alkali metal oxide, ferric nitrate enneahydrate a typical hydrated ferrous metal salt, and acetaldehyde a typical aldehyde.

I have found that primary and secondary ethynylcarbinols can be obtained in excellent yields and in a high state of purity by reacting aldehydes with a reactive and soluble variety of sodium or other alkali metal acetylide which is used in solution in the liquid ammonia in which it is formed and which is in turn prepared from a reactive and soluble variety of sodamide.

The preparation of this sodamide, which forms the first step of the present invention, is described by Vaughn, Vogt and Nieuwland (J. A. C. S. 56, 2120–2122 (1934), and consists in reacting sodium with excess liquid ammonia in the presence of catalytic proportions of sodium oxides and of ammonia-soluble, hydrated salts of iron, cobalt or nickel (herein termed "ferrous metal salts"). The second step of the invention, also mentioned by Vaughn, Vogt and Nieuwland, is to react the sodamide in situ (i. e., without isolating it from the liquid ammonia in which it is formed) with acetylene to form sodium acetylide of a variety which is particularly reactive. The third and final step of the invention, which is also new in itself, is to react the sodium acetylide in situ with the selected aldehyde. In this last step, the reaction is usually complete within about four hours. The ammonia is then evaporated off, the residue is treated with water, and the resulting solution or suspension is acidified to liberate the ethynylcarbinol.

Alkali metal amides prepared with the catalysts just given are more soluble in liquid ammonia and more reactive than alkali metal amides prepared by other methods. The greater solubility and reactivity are impaired or lost if the alkali metal amides are isolated from the liquid ammonia in which they are formed.

Having thus outlined the principles and purposes of the invention, the following exemplifications, wherein all parts are parts by weight, are added in illustration and not in limitation.

EXAMPLE I.—PROPARGYL ALCOHOL

A. Preparation of sodamide

One (1) part of sodium was added to a mechanically stirred mixture of 0.3 part of finely powdered ferric nitrate enneahydrate

$(Fe(NO_3)_3.9H_2O)$ in 385 parts of liquid ammonia contained in a reaction vessel of about four times the volume of the liquid ammonia used. Air was bubbled through the solution (to form oxides of sodium in the reaction mixture) until the blue color was discharged, and 46 parts (2 mols) of sodium were then added in small pieces. The reaction set in at once and in ten to twenty minutes the blue color changed to gray, indicating the end of the conversion. Any suspended catalyst may be removed by filtration.

B. Preparation of sodium acetylide

Acetylene was purified by passing successively through 10% sulfuric acid, through 10% sodium hydroxide, through a trap cooled in a solid carbon dioxide-methanol bath, and finally through calcium chloride drying towers. From the calcium chloride towers, it was passed rapidly into the liquid ammonia solution of sodamide prepared as described above, until the color of the solution changed from gray to black, the temperature of the reaction mixture being maintained at about —50° C. This change in color indicated that sodamide had completely reacted with acetylene to form sodium acetylide.

C. Preparation of the carbinol

To the solution of sodium acetylide in liquid ammonia, prepared as described under (B) above, were added 60 parts of paraformaldehyde. The reaction mixture was stirred for four hours, after which time the ammonia was allowed to evaporate. The residue was dissolved in 300 parts of water and enough acetic acid added to acidify the solution to litmus. The solution was then steam distilled and the distillate saturated with potassium carbonate. The non-aqueous layer was separated, dried, and distilled. The main fraction, boiling at 113°–115° C., was identified as propargyl alcohol.

EXAMPLE II.—METHYLETHYNYLCARBINOL

Following the procedure of Example I—C, 88 parts (2 mols) of freshly distilled acetaldehyde were reacted at —50° to —40° C. with an ammonical solution of 2 mols of sodium acetylide prepared as in Example I, parts A and B. Eighty-two (82) parts or a 57% yield of methylethynylcarbinol, a colorless water-soluble liquid boiling at 107°–109° C., was obtained.

EXAMPLE III.—ETHYLETHYNYLCARBINOL

Following the procedure of Example I—C, 116 parts (2 mols) of propionaldehyde were reacted with a liquid ammonia solution of 96 parts (2 mols) of sodium acetylide obtained as in Example I, parts A and B. Ninety (90) parts, or a 53.6% yield, of ethylenethynylcarbinol, a colorless water-soluble liquid boiling at 122°–125° C., was obtained.

EXAMPLE IV.—ISOPROPYLETHYNYLCARBINOL

A solution of 2 mols of sodium acetylide in liquid ammonia was prepared as in Example I, parts A and B. Two (2) mols (144 parts) of isobutyraldehyde were added to the solution at —60° to —50° C. with stirring over a period of thirty minutes. The reaction mixture was stirred for four hours, after which time the ammonia was allowed to evaporate. The residue was dissolved in 300 parts of water, and sufficient acetic acid was added to make the solution acid to litmus. The water-insoluble layer was separated, the water layer extracted twice with 70 parts of ether, and the extracts combined with the main fraction, which was then dried and distilled. The main fraction consisted of a straw-colored liquid, boiling at 130°–133° C. and somewhat soluble in water, which was identified as isopropylethynylcarbinol. The yield was 168 parts, or 81% of theory.

EXAMPLE V.—HEPTYLETHYNYLCARBINOL

A solution of 246 parts of alpha-ethylhexanal, dissolved in three times its volume of dry ether, was reacted with a solution of 96 parts of sodium acetylide in liquid ammonia prepared as in Example I. The reaction product was isolated in substantially the same manner as described in Example IV. It was a water-insoluble liquid, boiling at 120°–122° C. at 55 mm., and was identified as heptylethynylcarbinol, a compound of the formula

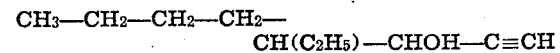

$$CH_3-CH_2-CH_2-CH_2-CH(C_2H_5)-CHOH-C\equiv CH$$

The yield was 199 parts, or 67% of theory.

EXAMPLE VI.—HEPTENYLETHYNYLCARBINOL

Ethylhexenal (216 parts), a compound of the formula $CH_3(CH_2)_2CH=C(C_2H_5)CHO$ boiling at 171°–174° C., was reacted according to the method of Example V with a solution of 96 parts of sodium acetylide in liquid ammonia, the latter being prepared as in Example I. One hundred forty-six (146) parts, or a yield of 56.2%, of heptenylethynylcarbinol, a water-insoluble liquid boiling at 115°–115.5° C./34 mm., was obtained. This compound has the formula

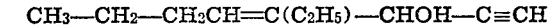

$$CH_3-CH_2-CH_2CH=C(C_2H_5)-CHOH-C\equiv CH$$

EXAMPLE VII.—ISOPROPENYLETHYNYLCARBINOL

Equimolar quantities of methylacrolein and sodium acetylide were reacted substantially as in Example I. Isopropenylethynylcarbinol, B. P. 141°–144° C. and $N_D^{25}$ 1.4589, was obtained.

EXAMPLE VIII.—OCTYLETHYNYLCARBINOL

Equimolar parts of octaldehyde and sodium acetylide were reacted as in Example I. Actylethynylcarbinol, a syrupy liquid boiling at 120°–122° C./55 mm., was obtained in 67% yield.

An aldehyde or any mixture of aldehydes in general may be employed in the process of the present invention. Examples of suitable aldehydes are formaldehyde, acetaldehyde, propionaldehyde, butyraldehyde, heptaldehyde, lauraldehyde, stearaldehyde, crotonaldehyde, acrolein, citral (geranial), benzaldehyde, cinnamic aldehyde, and phenylacetaldehyde. The aldehyde may be aliphatic, aromatic, alicyclic or heterocyclic; it may be saturated or unsaturated; it may have other functional groups such as carboxyl; and it may be a mono- or polyaldehyde.

In the first step of my invention, I prefer to use sodium and sodium oxide because of their availability and economy. However, they may be replaced wholly or in part by other alkali metals such as lithium, potassium, rubidium, and caesium, and by their oxides. The oxide used as a catalyst may or may not be that of the metal reacted. Thus, sodium may be reacted with ammonia which contains potassium oxide therein, and potassium may be reacted with ammonia which contains sodium oxide therein. It has been found to be most convenient to use about 1 to 3%, based on the weight of the alkali metal, of the alkali metal oxide. The sodium or other alkali metal oxide is preferably formed in situ as in the examples, since the addition of alkali metal oxide to the ammonia usually introduces alkali metal hydroxide which adversely affects the desired reaction. While ferric nitrate enneahydrate has been used to exemplify the second catalytic component, any ammonia-soluble hydrated salt of a ferrous metal, i. e., of iron, cobalt or nickel, may be employed. Thus, ferric chloride hexahydrate, ferric bromide hexahydrate, hydrated ferric acetate, hydrated ferric sulfate, ferric nitrate hexahydrate and hydrated nitrates, nitrites, cyanides, and thiocyanates generally of iron, cobalt and nickel may be employed. The hydrated ferric nitrates are preferred.

In the third step of the process, the aldehyde, before it is added to the liquid ammonia solution of the alkali metal acetylide, may if desired first be dissolved in a suitable solvent such as dry ether, hydrocarbons, or liquid ammonia. This expedient, however, is not generally necessary or desirable. Any acid can be used to neutralize the reaction mixture containing the ethynylcarbinol. Instead of the acetic acid of the examples, there may be used such acids as formic, nitric and sulfuric. As disclosed and claimed in Macallum, Serial No. 91,619, filed of even date herewith, ammonium chloride may also be used in the neutralization step. In some cases, it is convenient to isolate the ethynylcarbinols by extraction with a suitable solvent such as ether. In still other cases, the carbinols can be distilled from the alkaline reaction mixtures without neutralization or extraction.

The reaction between the alkali metal and ammonia can be carried out conveniently at the boiling point of ammonia at normal pressure, i. e., about −33° C. By the use of pressure, the reaction temperature may be raised, even up to the critical temperature of ammonia, i. e., 132° C. Temperatures lower than −50° C. are not desirable due to the decreased speed of reaction. The remaining steps in the process may be carried out similarly. Temperatures of about −50° C. to −30° C. and atmospheric pressure are preferred throughout the entire process. At lower temperatures, the solubility of the alkali metal acetylide in liquid ammonia is reduced, and at higher temperatures it has a tendency to induce polymerization of the aldehyde.

Elevated pressures are advantageous when operating at temperatures above the atmospheric boiling point of ammonia inasmuch as they enable the ammonia to be kept in the liquid state.

The time required in the third step for reacting the aldehyde with the alkali metal acetylide will vary with the aldehyde used and may range from one to several hours. The reaction is ordinarily completed after four hours, but it may in many instances be extended with advantage to five hours or more, higher yields being obtained thereby. This feature of the process is discussed in more detail in Macallum, Serial No. 91,619, filed of even date herewith. The latter application also shows that with longer reaction periods the alkali metal may tend to act as a catalyst for the formation of the ethynylcarbinol in the presence of excess aldehyde and acetylene. For example, yields considerably in excess of 100% based on the alkali metal have been obtained in this way.

The process is not limited to any particular proportions of reactants in any one of the three steps, except that in the first step an excess of liquid ammonia must be used over that required to react with the alkali metal to form the alkali metal amide, and that in the second step there must be a sufficient excess of liquid ammonia to dissolve the alkali metal acetylide as it is formed. These requirements are merely the necessary consequence of the use of liquid ammonia as a single, continuous solvent or reaction medium throughout all the steps of the process. As illustrated in the examples, reacting equivalents of sodium acetylide and aldehyde (i. e., 1:1 mol. ratios) are preferred in the third step in order to minimize the formation of by-products. The invention, however, is not limited to such proportions. For example, if a molecular excess of aldehyde over the sodium acetylide is employed, mixtures of products are obtained, viz., the monohydric ethynylcarbinols together with more or less of ethynyldicarbinols of the type

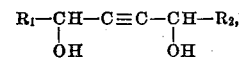

where $R_1$ and $R_2$ may, for example, be hydrogen or a monovalent hydrocarbon radical. When two or more mols of aldehyde are used per mol. of sodium acetylide, as much as 50–70% of the product may be the dicarbinol.

The ethynylcarbinols prepared as described herein may be used for many purposes. For example, their esters with certain acids are useful as plasticizers and solvents for natural or synthetic resins, cellulose derivatives, etc. The carbinols or their derivatives may also be employed as alcohol denaturants and as insecticides. Their metallic derivatives may be used as anti-knock compounds and fungicides. The carbinols may also be reduced to vinyl alcohols or to saturated alcohols, and can be hydrated to hydroxy-ketones. They are also useful as modifying agents for resins wherever alcohols are useful for this purpose.

The process described herein is advantageous in that it makes possible the preparation of primary and secondary ethynylcarbinols in better yields than have heretofore been possible. The new process avoids the difficulty, hazards, and expense incidental to the isolation and storage of unstable compounds such as sodamide and sodium acetylide, and to redissolving or dispersing them in liquid ammonia or other reaction media when they are to be used for the preparation of ethynylcarbinols, since in this process the compounds are prepared only when and as needed. Moreover, the low temperatures at which the reactions are carried out minimize polymerization of the reactants or of the products, thus promoting better yields and avoiding undesirable by-products. Owing to the fact that the reactants and products are all readily soluble in liquid ammonia, none of the difficulties are encountered which are incidental to the use of suspensions such as are necessary when the reactants are only slightly soluble in the reaction medium, i. e., the reaction mixtures remain liquid, do not settle, are easy to handle, stir, pump, etc. An additional advantage arising out of the greater solubility of the reactants in liquid ammonia is that they are brought into more intimate contact with each other and therefore react more readily and completely. The present process is superior to those using alkali metal acetylides prepared from the alkali metal and the acetylene in that hydrogenation losses are avoided.

As has already been pointed out, the sodium acetylide and the sodamide used in the present process are more reactive and more soluble in liquid ammonia when they are not isolated from the reaction mixtures in which they are prepared. To this fact is attributed in part the superiority of the process of the present invention over processes disclosed in the art. The highly soluble and reactive sodium acetylide described herein cannot be obtained by reacting acetylene with sodamide of the commercial variety. Ordinary sodium acetylide is not satisfactory for the purposes of this invention since it is neither sufficiently soluble in liquid ammonia nor sufficiently reactive to produce the high yields which are characteristic of the present process.

In the specification and claims by "ammonia" is meant the compound NH₃ and not the solution thereof in water which is ammonium hydroxide. The term "alkyl" is used in the sense of a saturated aliphatic hydrocarbon radical. The term "ferrous metal" is used in the sense of a metal of the class consisting of iron, cobalt and nickel.

The above description and examples are intended to be illustrative only. Any modification of or variation therefrom which conforms to the spirit of the invention is intended to be included within the scope of the claims.

I claim:

1. Process of preparing methylethynylcarbinol which comprises reacting 46 parts of sodium with an excess of liquid ammonia in the presence of 1.3 parts of sodium oxide and in the presence of 0.3 part of ferric nitrate enneahydrate, passing acetylene gas into the ammonia solution of sodamide thus prepared at −50° C. to −40° C. until the gray color thereof changes to black, adding 88 parts of dry acetaldehyde to the sodium acetylide thus obtained, and isolating the methylethynylcarbinol by evaporating the ammonia, dissolving the residue in water, acidifying and steam distilling the aqueous acid solution, and salting out the product from the steam distillate.

2. Process of preparing methylethynylcarbinol which comprises reacting sodium with an excess of liquid ammonia in the presence of sodium oxide and in the presence of ferric nitrate enneahydrate, passing acetylene gas into the solution until the gray color thereof turns to black, adding acetaldehyde at about −40° C., and isolating the methylethynylcarbinol.

3. Process of preparing heptylethynylcarbinol which comprises reacting sodium with an excess of liquid ammonia in the presence of sodium oxide and in the presence of ferric nitrate enneahydrate, passing acetylene gas into the solution until the gray color thereof turns to black, adding ethylhexanal at about −40° C., and isolating the heptylethynylcarbinol.

4. Process of preparing heptenylethynylcarbinol which comprises reacting sodium with an excess of liquid ammonia in the presence of sodium oxide and in the presence of ferric nitrate enneahydrate, passing acetylene gas into the solution until the gray color thereof turns to black, adding ethylhexenal at about −40° C., and isolating the heptenylethynylcarbinol.

5. Process of preparing ethynylcarbinols having a hydrogen and a seven carbon atom aliphatic residue on the carbinol carbon which comprises reacting an alkali metal with an excess of liquid ammonia in the presence of an alkali metal oxide and in the presence of an ammonia-soluble hydrated salt of a ferrous metal, passing acetylene gas in excess into the solution thus prepared, then adding at about −40° C. an aliphatic aldehyde containing eight carbon atoms and isolating the ethynylcarbinol thus produced.

6. Process of preparing ethynylcarbinols having at least one hydrogen on the carbinol carbon which comprises reacting an alkali metal with an excess of liquid ammonia in the presence of an alkali metal oxide and in the presence of an ammonia-soluble hydrated salt of a ferrous metal, reacting acetylene with the alkali amide thus prepared, reacting the alkali acetylide thus prepared with an aldehyde and isolating the primary or secondary carbinol.

7. In the process of preparing ethynylcarbinols having at least one hydrogen on the carbinol carbon, the step which consists in reacting an aldehyde with a liquid ammonia solution of an alkali metal acetylide of the formula MC≡CH wherein M is an alkali metal, said solution being that in which the alkali metal acetylide is formed.

8. Ethynylcarbinols of the formula

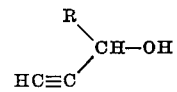

wherein R is a seven carbon aliphatic hydrocarbon radical.

9. Heptylethynylcarbinol of the formula

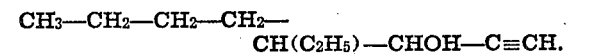

10. Heptenylethynylcarbinol of the formula

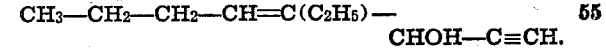

OSCAR ROBERT KREIMEIER.

CERTIFICATE OF CORRECTION.

Patent No. 2,106,181.   January 25, 1938.

OSCAR ROBERT KREIMEIER.

It is hereby certified that error appears in the printed specification of the above numbered patent requiring correction as follows: Page 2, second column, line 60, for the words "An aldehyde" read Any aldehyde; and that the said Letters Patent should be read with this correction therein that the same may conform to the record of the case in the Patent Office.

Signed and sealed this 3d day of May, A. D. 1938.

(Seal)

Henry Van Arsdale,
Acting Commissioner of Patents.